Dec. 5, 1933.     E. DELANO     1,937,686
AUTOMATIC BRAKE
Filed Nov. 19, 1930
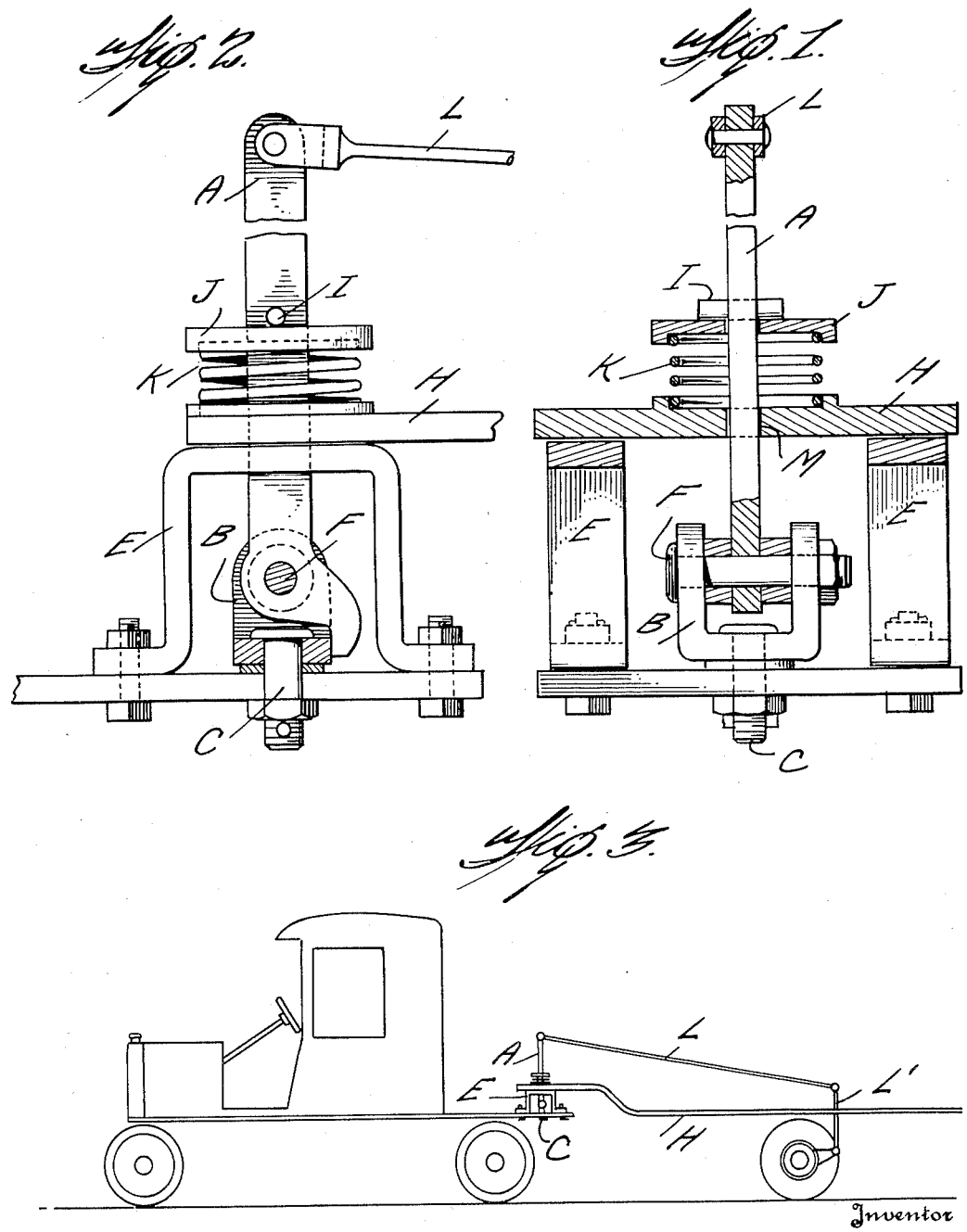
Inventor
EDUARDO DELANO
By
Attorney Patented Dec. 5, 1933

1,937,686

UNITED STATES PATENT OFFICE 1,937,686

AUTOMATIC BRAKE

Eduardo Délano, Santiago, Chile

Application November 19, 1930
Serial No. 496,714

3 Claims. (Cl. 188—142)

This invention is directed to an automatic control wherein two connected or coupled elements may be relatively governed to a useful end as, for example, where a connected truck and trailer are given relative movement incident to braking action of the truck. The installation of the improved controlling means serves to automatically brake the truck.

The invention comprehends an element which in its use as a connection between the truck and trailer may serve to permit all necessary relative movements of the truck and trailer incident to the traveling of the vehicles, with the parts always in position to utilize undue movement of one of the vehicles to transfer a corresponding movement to the other of such vehicles.

The invention is illustrated in the accompanying drawing, in which:—

Figure 1 is a side view of the device showing the same applied to a base such, for example, as an auto truck frame.

Figure 2 is a transverse sectional view, partly in elevation, of the same.

Figure 3 is a more or less diagrammatic view showing the device in use as forming the coupling between a truck and trailer.

The device in the use with which it is to be more specifically described includes a lever A pivotally connected on a pin F supported in free terminals of the arms of a U-shaped member B connected by a pin or bolt C to the rear of the truck or other vehicle to permit free turning movement of the lever as a whole incident to the similar relative movement of the trailer H. Mounted on each side of the element B are inverted U-shaped supports E bolted to the truck frame and forming a guiding support for the forward end of the appropriate part of the trailer. By this arrangement, the trailer is permitted a limited free movement toward and from the truck, the lever A passing loosely through an opening M in the trailer element resting upon the supports E. The normal relation between the trailer element lying on the support and the supports is maintained by a coiled spring K seated in a recess in the upper end of the trailer element and engaging beneath a plate J held in position to maintain the spring compressed by a pin I passing through an opening in the lever A. The spring K maintains the two parts of the coupling in resilient union so that when traveling over uneven roads the trailer may nullify the vertical movements caused by vibration or shock and also those arising in the direction of traction.

The lower end of the lever A below the pivot pin F is formed with an offset which engages the cross bar of the U-shaped element B at the rear side of said bar relative to the truck or other element on which the connection is mounted. The upper end of the lever A is connected by a rod L to an auxiliary lever L' mounted on the frame, with the latter connected to a brake operating arm for controlling the brakes of two or more wheels of the trailer. This connection is illustrated in Figure 3 diagrammatically, and as it forms no essential part of the present device, no further description thereof is deemed necessary.

In the normal movements of the truck, the lever A serves as the coupling for the trailer, as such lever cannot move rearwardly beyond a vertical position owing to the bearing connection between the lower end of the lever and the U-shaped element B. In the independent turning movements of the trailer relative to the truck, such turning movements are communicated to the lever A and by the lever A to the element B, permitting the free turning of the trailer, as will be obvious. In the event the forward motion of the truck is interrupted, as by braking or other means, the inertia of the trailer swings the upper end of the lever A forwardly incident to the connection between the forward portion of the trailer and the lever, with the result that the rod L is drawn upon and the lever L' operated and the brakes applied to the trailer.

While showing and describing the invention as applied to a connecting means between the truck and trailer, it is, of course, obvious that the invention is broader than such application and that the invention is directed to an automatic mechanism actuated by the weight of a movable mass during moment of inertia to control that mass in its relation to another mass with which it may be coupled or connected. With this understanding of the invention, it is quite obvious that it is applicable for many other purposes than that specifically described herein and such other uses and purposes are contemplated as a part of this invention.

I claim:—

1. A coupling between a leading vehicle and a following vehicle including a U-shaped member mounted for free turning movement on the leading vehicle, a lever mounted for swinging movement on the member, a connection between the lever and following vehicle, means for limiting swinging of the lever in one direction without interfering with free swinging in the opposite direction, and means for actuating the brakes of the following vehicle, said means being connected to the lever and operatively responsive to a swinging movement of the lever.

2. A coupling between a leading vehicle and a following vehicle, including a lever mounted for swinging movement in one direction on the leading vehicle, said lever being capable of free turning movement about an axis perpendicular to the axis about which the lever swings, means for connecting the following vehicle to the lever to utilize the inertia of the following vehicle to swing the lever in the permissible direction, and means controlled by the lever for actuating the brakes on the following vehicle in such swinging movement.

3. A coupling between a leading vehicle and a following vehicle including a lever mounted on the leading vehicle and supported for rotative movement with respect to the leading vehicle, said lever being also mounted for swinging movement in one direction about an axis perpendicular to the axis about which the lever rotates, means for connecting the lever to the following vehicle to compel vertical movement of the lever in the permissible direction under inertia of the following vehicle, and brake controlling elements connected to and operated by said lever.

EDUARDO DÉLANO.